May 3, 1938.  M. S. JOHNSON  2,115,955
MULTIPURPOSE GAUGE
Filed June 2, 1936
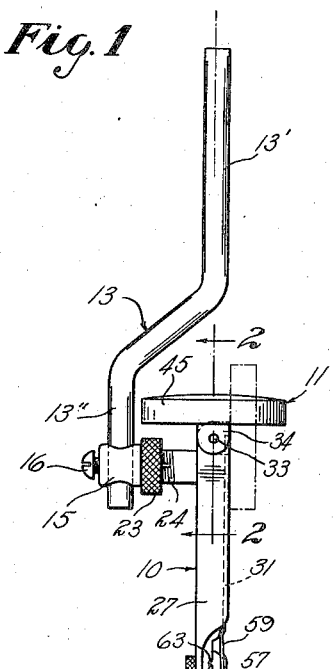
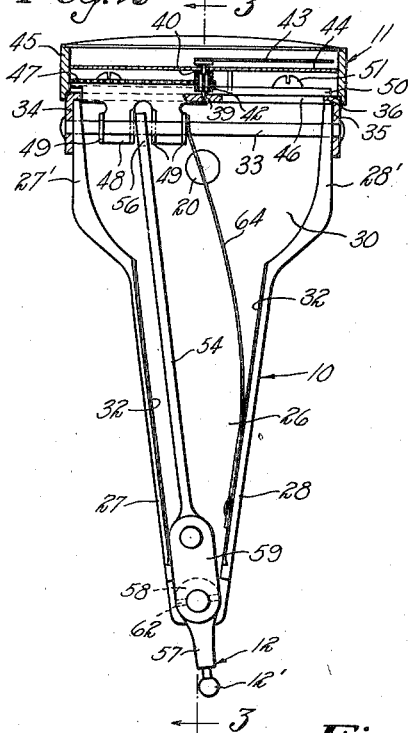
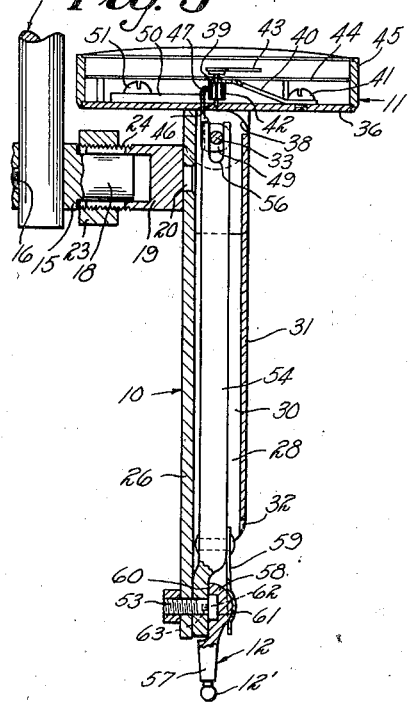
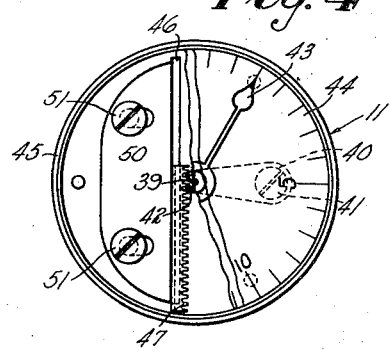
Inventor
MARTIN S. JOHNSON
By T. Clay Lindsey
Attorney Patented May 3, 1938

2,115,955

UNITED STATES PATENT OFFICE 2,115,955

MULTIPURPOSE GAUGE

Martin S. Johnson, West Hartford, Conn.

Application June 2, 1936, Serial No. 83,041

11 Claims. (Cl. 33—172)

This invention relates in general to gauging devices and more particularly to a multi-purpose amplifying gauge of the dial type which is adapted to indicate minute irregularities in the surface contour of an object.

Heretofore, various types of indicating gauges have been employed to measure irregularities in a work surface, but these devices have usually comprised expensive, delicate, and complicated mechanisms each of which was solely adapted for one particular type of work. For example, a gauge primarily intended for indicating irregularities in a plane surface was not adapted for measuring the extent of eccentricity of a circular hole or for measuring the extent of out-of-round condition of a substantially cylindrical rotating member. Furthermore, such of these gauges as do employ dial indicating mechanisms are not adapted for easy reading or for reading while the gauge is being rotated about a fixed axis.

It is, therefore, the primary object of my invention to provide a simply constructed, inexpensive, but accurate type of indicating gauge which may be employed for many different purposes and which is provided with an indicator that may be easily read at all times irrespective of the use to which the gauge is employed.

It is a further object of my invention to provide a dial type of indicating gauge wherein the dial may be angularly adjusted so that it is easily visible at all times.

Other objects will be in part obvious and in part pointed out more in detail in the following specification.

My invention accordingly resides in the features of construction, combination of elements, and arrangement of parts which will be exemplified in the construction hereinafter set forth and the scope of the application which will be indicated in the appended claims.

In the accompanying drawing illustrating one embodiment of my invention and wherein like parts are indicated by like numerals:

Figure 1 is a side elevation of my invention;

Fig. 2 is an enlarged front elevation of my invention taken substantially along the lines 2—2 of Fig. 1 and showing certain of the parts in section and the casing cover removed to better disclose the operative parts of the mechanism;

Fig. 3 is a sectional view taken substantially along the lines 3—3 of Fig. 2; and Fig. 4 is a fragmentary plan view of the indicating dial and associated parts, some of which are broken away to better disclose the operative mechanism.

In accordance with my invention, one embodiment of which is illustrated, I have provided a casing 10, having a dial indicating mechanism 11 pivotally mounted for angular movement at its upper end and a feeler mechanism 12 pivotally secured to its lower end and operatively connected to the dial mechanism. A supporting arm in the form of a Z-bar 13 is adjustably and angularly secured to the upper portion of the casing to position the gauge for its various uses.

The Z-bar is provided with a cylindrical upper gripping portion 13' and a parallel lower end portion 13" which is slidably and angularly mounted within a clamping head 15 and secured thereto by suitable clamping means such as a screw 16. The inner end of head 15 has a reduced hub portion 18 adjustably clamped within a collet member 19 having a reduced hub 20 at its inner end rigidly secured to the rear wall of the casing as by riveting. A collet nut 23 mounted on a threaded portion 24 serves to clamp hub 18 in desired slidable and angular adjusted position. The offset of Z-bar 13 is such that the cylindrical gripping portion 13' may be located coaxially with the dial mechanism 11 and with a rounded work engaging head 12' of the feeler mechanism as shown by the dot and dash central line in Fig. 1.

The casing 10 is provided with a rear wall 26 from the side edges of which laterally extend a pair of opposed tapering side walls 27 and 28 converging downwardly as illustrated in Fig. 2. These walls define a somewhat triangular shaped inner cavity 30 within which various operative parts are located. A removable cover 31 is provided with opposed beveled side edges adapted to slidably interlock within undercut grooves 32 in the outer edges of the side walls.

The upper ends of the side walls adjacent the dial indicating mechanism terminate in parallel spaced portions 27' and 28' adapted to receive a transversely extending pin 33, the outer ends of which pivotally support a pair of opposed depending ears 34 and 35 on a base plate 36 of the dial indicating mechanism. Pin 33 may be secured in position by upsetting its opposite ends. Ears 34 and 35 preferably frictionally engage walls 27' and 28' so that the indicating mechanism may be pivotally positioned on pin 33. The upper ends of side walls 27' and 28' may be provided with curved portions 38 coaxial with pin 33 so that the dial mechanism 11 may be angularly adjusted through approximately 90° or any intermediate extent thereof, as shown in Fig. 1. Hence, it will be evident that the indicating dial may be angularly preset in such position as to be conveniently read at all times by the operator depending upon the uses to which the gauge is to be employed.

The dial indicating mechanism 11 has a central spindle 39 journalled at its lower end within plate 36 and at its upper end in a supporting bracket 40 fastened to the base plate by a screw 41. Pinion 42 is secured on the spindle intermediate of its ends, and an indicating needle 43 is mounted on the upper end of the spindle. A dial 44 supported above the base on pins and located between the bracket and needle is provided with a series of graduations beneath the pointer end of the needle. A casing or head 45 which, in the present instance, is substantially cylindrical, is secured to the base plate 36 and provided with a cover glass to protect the indicating mechanism and provide clear visibility for reading the movement of the needle over the graduated scale.

Base plate 36 is provided with a transversely extending slot 46 adjacent to spindle 39 and parallel to pin 33, and a rack member 47 extends through the slot into toothed engagement with pinion 42. The bottom of rack member 47 is provided with a bifurcated portion 48 having laterally projecting ears 49 journalled for slidable and pivotal movement on pin 33. Rack 47 may be adjustably positioned relative to pinion 42 by means of a slidable guide plate 50 abutting the rack member and having slotted portions through which extend clamping screws 51 secured to base plate 36. In view of the fact that rack bar 47 and plate 36 are both coaxially located on pin 33, it will be evident that the entire mechanism 11 may be angularly positioned at any time without affecting the operating mechanism or the position of the needle relative to the graduated scale.

The lower end of rear wall 26 has a bolt 53 extending therethrough and pivotally supporting the lower end of an amplifying lever 54 provided with an upwardly extending portion terminating in a fork 56 straddling pin 33 and received within bifurcated portion 48 of member 47. The feeler mechanism 12 has a short lever arm 57 secured to and depending from lever 54 whereby a relatively short angular movement of head 12' will result in a considerable angular movement of the fork 56 which movement in turn is transmitted through rack 47 and pinion 42 to move the needle 43. It will be appreciated, of course, that the amplification may be of any desired extent, but, in the present instance, a movement of head 12' through one-thousandth of an inch is sufficient to cause a needle movement of two graduations, and the scale may be provided with a sufficient number of graduations to measure a movement of head 12' through several thousandths of an inch.

In the event that head 12' is moved through a greater distance than can be measured, a safety device is provided so that no undue strain will be exerted upon the indicating mechanism. To accomplish this, member 57 terminates in an upper semi-spherical portion 58 engaged by the cupped portion of a spring 59 secured to the lower end of lever 54. Rounded portion 58 terminates in a flat surface 60 having a bore 61 therein receiving the cylindrical head of bolt 53, and a pair of transversely extending ears 62 are received within mating grooves 63 cut within lever 54 diametrically of bolt 53. Head 12' may be secured to member 57 in any suitable manner, and, in the present instance, is provided with an upwardly projecting cylindrical portion frictionally secured within a bore in member 57. In the event that head 12' is moved through too great an extent, ears 62 will jump out of grooves 63, thus permitting a greater angular movement of lever arm 57 which is not transmitted to the operating mechanism. It will be appreciated, of course, that under normal operation, spring 59 serves to secure the feeler mechanism in locked engagement so that angular movement will be transmitted between lever 57 and lever 54. A spring 64, rigidly secured at one end within the cavity 30 to one of the side walls, is provided with an upper slotted portion resiliently engaging against the depending portion of member 47, thereby tending to maintain needle 43 at a substantially zero position.

In the operation of my invention, portion 13' of the Z-bar is secured in a chuck, tool head, or other suitable holder, after which the casing 10 is clamped in such position relative to the Z-bar by screw 16 and nut 24 that head 12' tangentially contacts the surface to be gauged. I preferably so locate head 12' in contact with the work surface that arm 54 is initially shifted through approximately one-half of its movement in a direction opposed by spring 64. The dial mechanism 11 is angularly adjusted to a convenient reading position, and movement of head 12' over the work surface will cause needle 43 to move toward the right or left from its initial setting, thereby indicating the extent of minute variation in work surface.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A gauge comprising a casing, a dial indicator, means pivotally securing the indicator for rotatable adjustment on one end of the casing about an axis of rotation disposed transversely of said casing, a supporting arm, means to rigidly secure said arm to the casing in adjustable angular relation, means permitting a relative slidable adjustment of the arm and casing, an amplifying lever movably supported on the casing, resilient means tending to maintain said lever at an initial position, means translating the lever movement to a corresponding dial indicator movement irrespective of the adjusted position of the indicator on the casing, a work engaging member operatively connected with the amplifying lever, and means including a breakable connection between said member and lever arranged to prevent transmission of undue stresses to the dial indicator in the event that the member is moved beyond a predetermined extent.

2. In a gauge, a casing, a pivot pin transversely supported in one end of the casing, a dial indicator mounted on the pin for angular positioning relative to the casing, said indicator having a graduated circular dial and a needle coaxially movable thereover, a supporting arm having a gripping portion adapted to be located coaxially of the needle movement, means to angularly and adjustably secure the arm in rigid relation to the casing, an amplifying lever pivotally mounted on the opposite end of the casing, means slidably and pivotally supported on the pin for translating an angular lever movement into a corresponding needle movement, and a work engaging member operatively connected to the amplifying lever.

3. In a gauge, a casing, a supporting arm associated therewith, adjustable means connecting the arm to the casing, a pivot pin transversely supported in one end of the casing, a dial indicator mounted on the pin and arranged for angular adjustment relative to the casing, the indicator having a graduated circular dial, a shaft pivotally mounted in the indicator coaxial of the dial, a gear mounted on said shaft and a needle secured to the shaft in movable relation to the dial graduations, an amplifying lever pivotally mounted on the opposite end of the casing, a longitudinally movable rack in enmeshed engagement with the gear, said rack having a depending portion slidably journalled on the pin and engageable with the amplifying lever, resilient means tending to maintain the indicator at an initial registration, and a work engaging member operatively connected to the amplifying lever.

4. In a gauge, a casing, a supporting arm associated therewith, adjustable means connecting the arm to the casing, a pivot pin transversely supported in one end of the casing, a dial indicator mounted on the pin and arranged for angular adjustment relative to the casing, the indicator having a graduated circular dial, a shaft pivotally mounted in the indicator coaxial of the dial, a gear mounted on said shaft and a needle secured to the shaft in movable relation to the dial graduations, an amplifying lever pivotally mounted on the opposite end of the casing, a longitudinally movable rack in enmeshed engagement with the gear, said rack having a depending portion slidably journalled on the pin and engageable with the amplifying lever, means on the indicator to adjust the enmeshed relation of the rack and gear, resilient means engageable with the lever and tending to maintain the indicator at an initial registration, and a work engaging member operatively connected to the amplifying lever.

5. A gauge comprising a casing, a dial indicator mechanism, means pivotally securing said indicator for rotatable adjustment as a unit on the casing about an axis of rotation disposed transversely of the casing, additional means adjustably supporting the casing, a work engaging member movably supported on the casing, and amplifying mechanism connecting said work engaging member to the dial indicator to operate said indicator in any position of said adjustment.

6. In a gauge, a casing, an indicator, means pivotally securing the indicator as a unit to one end of the casing for rotary adjustment about an axis of rotation extending transversely of the casing, supporting means adjustably secured to the casing, an amplifying lever pivotally supported at the other end of the casing, a work contacting member connected to said amplifying lever, and means connecting the lever to the dial indicator to operate said indicator irrespective of its adjusted position.

7. In a gauge, a casing, a dial indicator having a head, pivotal means extending transversely through one end of the casing and rotatably securing said head to the casing for angular adjustment relative thereto, adjustable supporting means for said casing, an amplifying lever pivotally mounted on the other end of the casing and having a work contacting member secured thereto, means operatively connecting the amplifying lever to operate the indicator irrespective of the angular position of said head, and means urging said indicator to an initial starting position.

8. In a gauge, a casing, a pivot pin supported by and transversely extending through one end of the casing, a dial indicator rotatably supported by said pin for angular adjustment as a unit at any time relative to the casing, means adjustably and rigidly supporting the casing, an amplifying lever pivotally supported on the other end of the casing, said dial indicator including a graduated dial and a needle movable relative thereto, connections translating the lever movement into a corresponding needle movement irrespective of the angular adjustment of the indicator unit, resilient means tending to return the needle to an initial setting, and a work engaging member operatively connected to the amplifying lever.

9. In a gauge, a casing, adjustable supporting means therefor, a pivot pin transversely supported in one end of said casing, a dial indicator mounted on the pin for angular movement as a unit relative to the casing, said indicator having a graduated circular dial, a shaft journalled in the indicator coaxial of the dial, a gear fastened to the shaft and a needle secured to the shaft in indicating relation to said dial graduations, an amplifying lever pivotally mounted on the opposite end of the casing, a longitudinally movable rack enmeshed with said gear and having a depending portion slidably journalled on said pin and responsive to movement of the amplifying lever, resilient means urging the needle to an initial starting position, and a work engaging member connected to the amplifying lever.

10. A gauge comprising a casing, an indicator having a registering device, means rotatably supporting the indicator as a unit at one end of the casing for angular adjustment about an axis of rotation disposed transversely of the casing, a supporting arm, means adjustably securing said arm to the casing, an amplifying lever mounted on the casing, means translating the movement of said lever to a corresponding indicator registration irrespective of the adjusted position of the indicator unit on the casing, and means tending to return the registering device to an initial starting position.

11. A gauge comprising a casing, an indicator including a registering device, means pivotally supporting the indicator as a unit at one end of the casing for rotatable adjustment about an axis of rotation disposed transversely through one end of the casing, a supporting arm, means adjustably securing said arm to the casing, an amplifying lever supported by the casing, means translating the movement of said lever into a corresponding registration of the indicator irrespective of the position to which the unit is adjusted relative to the casing, a spring tending to return the registering device to an initial setting, a work engaging member, and a breakable connection between the work engaging member and the amplifying lever which prevents movement of the indicating device beyond a predetermined registration.

MARTIN S. JOHNSON.